United States Patent [19]

Norman et al.

[11] Patent Number: 4,965,083
[45] Date of Patent: Oct. 23, 1990

[54] REMOVAL OF BITTERNESS FROM CITRUS JUICES USING A POST-CROSSLINKED ADSORBENT RESIN

[75] Inventors: Seth I. Norman; Richard T. Stringfield, both of Midland, Mich.; Christopher C. Gopsill, Wilmslow, England

[73] Assignee: The Dow Chemical Company, Midland, Mich.

[21] Appl. No.: 326,186

[22] Filed: Mar. 20, 1989

Related U.S. Application Data

[63] Continuation-in-part of Ser. No. 172,059, Mar. 23, 1988.

[51] Int. Cl.$^5$ ............................. A23L 2/30; A23L 2/36
[52] U.S. Cl. ..................................... 426/422; 426/271; 426/330.5; 426/333; 426/590; 521/31; 521/33
[58] Field of Search ..................... 426/271, 330.5, 333, 426/590, 422; 521/31, 33

[56] References Cited

U.S. PATENT DOCUMENTS

| 4,191,813 | 3/1980 | Reed et al. | 426/330.5 |
| 4,192,920 | 3/1980 | Amick | 521/31 |
| 4,263,407 | 4/1981 | Reed, Jr. | 521/31 |
| 4,439,458 | 3/1984 | Puri | 426/330.5 |
| 4,514,427 | 4/1985 | Mitchell et al. | 426/271 |
| 4,522,836 | 6/1985 | Dechow et al. | 426/271 |
| 4,668,709 | 5/1987 | Jones et al. | 521/31 |

FOREIGN PATENT DOCUMENTS 58-56663  4/1983  Japan .................. 426/271

Primary Examiner—Donald E. Czaja
Assistant Examiner—D. Workman

[57] ABSTRACT

Bitter components, such as limonin, may be effectively removed from citrus juices, particularly navel orange juices, by contacting the juices with an adsorbent resin. The adsorbent resin is derived from a copolymer of a monoethylenically unsaturated monomer and a crosslinking monomer, where the copolymer has been post-crosslinked in the swollen state in the presence of a Friedel-Crafts catalyst and functionalized with hydrophilic groups. Preferably, the copolymers are styrene and divinylbenzene.

35 Claims, No Drawings

REMOVAL OF BITTERNESS FROM CITRUS JUICES USING A POST-CROSSLINKED ADSORBENT RESIN

CROSS-REFERENCE TO RELATED APPLICATIONS

This is a continuation-in-part of copending U.S. application Ser. No. 172,059, filed Mar.23, 1988.

FIELD OF INVENTION

The present invention relates to certain adsorbent resins and a method of using such to remove bitter components from citrus-fruit juices, particularly navel orange juices.

BACKGROUND OF INVENTION

The bitterness in citrus juices is derived from bitter components such as flavanoids, predominantly naringin, and/or limonoids and their precursors, predominantly limonin. The presence of bitterness is often accentuated by processing of the fruit to juice or juice concentrate. For example, limonin is formed from its non-bitter precursor limonoic α-ring lactone, which is initially present in the albedo of citrus fruits. The formation of limonin from its precursor takes place in the presence of an acidic environment or upon heating. Therefore, processes of juice extraction, heat pasteurization and concentration, and storage of juice or concentrate result in limonin induced bitterness, especially in early season orange, navel orange and lemon juices. Thus, it would be desirable to have a process for removing bitterness from juice. Limonin levels in excess of about 6 parts per million (ppm) are detectable as bitterness by most of the population, 20 percent of the population can detect levels down to 2 ppm.

U.S. Pat. No. 4,514,427 discloses debittering and reducing the acidity of grapefruit juice by contacting the grapefruit juice with a weak base anion exchange resin in the freebase form. When processing many juices such as orange juice using this process, the anion exchange resin in the freebase form adsorbs a large amount of the citric acid in the juice, which causes the pH of the juice to become basic. The increase in pH of the juice may cause the denaturing of the proteins present in the juice and result in an inferior quality juice. In addition, these denatured proteins can form small gellular masses which embed themselves in the resin. The result is excess pressure buildup within the resin vessel which leads to premature work stoppage. The denatured proteins are very difficult to remove from the resin, thereby resulting in excessive resin replacement costs. Another problem with the anion exchange resin used in the above-described process is that it does not have a large enough capacity to remove enough bitter components to get below the consumer threshold level of 6 ppm in a single passage. Furthermore, if the weak base resin is not used in its freebase form, the weak base resin's capacity for bitter components is unacceptably low.

U.S. Pat. No. 4,439,458 discloses debittering citrus fruit juice by contacting the clarified juice (i.e., juice with the pulp removed by passing the juice through a centrifuge) with a polystyrene adsorbent copolymer, crosslinked with divinylbenzene. After contact with the adsorbent, the clarified citrus juice is recombined with the pulp. The problem with the above-described process is that although some of the bitter taste is removed, the limonin precursor is still present in the untreated pulp. Thus, the juice still has somewhat of a bitter taste, especially after subsequent processing. Another problem with the process described above is that prior to contact with a juice the adsorbent copolymer must be pretreated with a water-soluble alcohol to extract any residual monomers such as, divinylbenzene for the copolymer. At the present time, the juice plants are not equipped to handle flammable liquids in their plants, and to install such equipment would probably be cost prohibitive.

It would be desirable to provide an efficient and commercially viable process for selectively removing bitter components such as, limonin or naringin or its precursors from citrus fruit juices. This would provide for more complete removal of bitterness from the juices.

SUMMARY OF THE INVENTION

The present invention is a process for removing bitter components such as, limonin, naringin or their precursors from citrus fruit juices, particularly navel orange juice.

The method comprises contacting the citrus juice containing the bitter components with an adsorbent resin. The adsorbent resin is prepared by contacting a copolymer in a swollen state with a Friedel-Crafts catalyst under conditions effective to catalyze the post-crosslinking and rearrangement of the swollen copolymer. The contact is maintained for a time sufficient to reduce the level of bitter components, such as naringin, limonin or their precursors in the citrus juice. The adsorbent resin is derived from a copolymer of a monoethylenically unsaturated monomer and a crosslinking monomer, preferably the copolymer is a styrene and divinylbenzene copolymer. In a preferred embodiment, the copolymer is chloromethylated and then post-crosslinked to make the adsorbent resin.

The present invention provides a surprisingly effective method for debittering citrus fruit juices using an adsorbent resin which has good physical stability under the conditions of treatment. The resin can be easily regenerated with basic solutions and thus does not require the use of pretreatment with alcohol. The present invention minimizes the change in the citrus juices pH, even if the adsorbent resin is pretreated with a basic solution, therefore denaturing of the proteins in the juice does not occur. In addition to removing the bitter components, the invention provides an effective means of removing the bitter components, while not removing a substantial amount of the citric acid from the citrus juice.

DETAILED DESCRIPTION

The invention herein is a process of debittering citrus juices and in another respect the invention is also a process of debittering citrus juices, while not removing a substantial amount of citric acid from the juice. Generally, the process comprises the step of contacting the juice with an effective amount of an adsorbent resin for a time period sufficient to remove the bitter components from the juice.

These adsorbent resins are derived from crosslinked copolymers that have been post-crosslinked in the swollen state in the presence of a Friedel-Crafts catalyst and functionalized with hydrophilic groups. These post-crosslinked copolymers can be gellular, or macroporous. Preferably, the copolymers are macroporous.

The copolymers are derived from crosslinked copolymers of (1) a polyunsaturated monomer, containing a plurality of non-conjugated $CH_2=C<$ groups, which acts as a crosslinking agent, and (2) a monoethylenically unsaturated monomer. At least one of the polyunsaturated and monoethylenically unsaturated monomers is aromatic, and preferably both are aromatic, provided that at least a major portion (at least 50 percent by weight based on the total weight of monomers used) is aromatic.

Preferably, the monoethylenically unsaturated monomer is a monovinyl aromatic monomer. Monovinyl aromatic monomers include styrene and its derivatives, such as ortho-, meta- and para-methyl styrenes, and ortho-, meta-, and para-ethyl styrenes vinyltoluene: ethylvinylbenzene: vinylnaphthalene: vinylbenzyl chloride and vinylbenzyl alcohol. Crosslinking monomers broadly encompass the polyvinylidene compounds listed in U.S. Pat. No. 4,382,124. Preferred polyunsaturated crosslinking monomers are divinylbenzene (commercially available divinylbenzene containing less than about 45 weight percent ethylvinylbenzene), trivinylbenzene, and ethylene glycol diacrylate and the like. Other suitable aliphatic polyunsaturated monomers can include divinylsulfide and such similar compounds While hydrocarbon monomers are preferred, the crosslinking monomers may also include heterocyclic compounds such as divinylpyridine.

For crosslinking, sufficient amounts of the polyunsaturated monomer will be used to give dimensional stability to the copolymers so that it will swell rather than dissolve in the subsequent swelling steps. The amount of crosslinking required will depend on the copolymers porosity characteristics desired. The percent crosslinking prior to post-crosslinking is based on the percent weight of the copolymers which is attributable to the polyunsaturated monomer. The crosslinker serves to increase the physical stability of the adsorbent resin. The amount of crosslinker required depends significantly on the process conditions used to prepare the copolymer and can range anywhere from about 1 to about 45 percent by weight of total monomer, preferably from about 4 to about 8 percent by weight. The suitable amounts of the crosslinker required when making a gellular copolymer bead is from about 0.25 to about 15 percent, preferably from about 1 to about 10 percent by weight of total monomer.

The preferred macroporous copolymer is a copolymer of up to about 99.75 weight percent styrene with the balance divinylbenzene. Another preferred macroporous copolymer is a copolymer of about 40 to about 60 weight percent styrene, about 40 to about 60 weight percent vinylbenzyl chloride and about 1 to about 20 weight percent divinylbenzene. The macroporous copolymers may contain minor amounts of other monomers, such as the esters of acrylic and methacrylic acid, and acrylonitrile. When commercial grades of divinylbenzene are used, from about 5 to about 50 weight percent of the divinylbenzene is ethylvinylbenzene, and it is conventional to include the ethylvinylbenzene with the styrene or other monovinyl monomer when specifying the proportion of styrene or other monovinyl monomer.

Generally, these copolymers can be prepared by suspension polymerization of the monomer composition under conditions conventionally used to prepare ion exchange resins, in the presence of one or more porogenic diluents using quantities sufficient to cause phase separation of the prepared copolymer from the diluent. Conventional methods of suspension polymerization of the monomers are well known in the art and described in *Ion Exchange* by F. Helfferich, published in 1962 by McGraw-Hill Book Company, N.Y., which is incorporated herein by reference. Further, U.S. Pat. Nos. 4,419,242: 4,564,644 and 4,444,961 illustrate methods of suspension polymerization. Although, it should be noted that there are many other polymerization techniques known in the art for preparing copolymers which could be useful in polymerization herein.

More specifically when preparing copolymers under suspension polymerization conditions, a free-radical catalyst and an organic liquid can be used to function as a porogenic agent. By "porogenic agent" is meant any material used during polymerization which increases the porosity or permeability of the copolymer. The preferred organic liquids act as solvents for the monomers, but are not solvents for the product copolymer. The porogenic agent is inert in that it does not react with the monomers, copolymers or suspending medium. The desired porogenic agent will be determined by the character of the monomers in the monomer mixture and the type of porosity characteristics desired. If gellular type copolymers are desired, the copolymerization may be carried out in the absence of the porogenic agent.

The porogenic agents may be separated into two groups depending on the type of swelling effect the liquid has on the copolymer. Non-swelling porogenic liquids are solvents for the monomer mixture being polymerized and exert essentially no solvent action on the copolymer. Any liquids which are solvents for the monomer mixture and which give negligible swelling of the copolymer are suitable. Such non-swelling agents are typically used in the preparation of macroporous copolymers. Examples of such non-swelling porogenic agents include alkanols with a carbon atom content of from about 4 to about 10, and higher saturated aliphatic liquid hydrocarbons, such as heptane and isooctane. As a further guide in the selection of a suitable porogenic agent, reference may be made to scientific literature for instance, the discussion of such porogenic agents in Hildebrand and Scott, *Solubility of Non-Electrolytes*, 3d ed., N.Y. 1950.

In general, it may be stated that sufficiently wide differences in the solubility parameters of polymer and solvent, respectively, must exist for the porogenic agent to be effective and that, once an effective porogenic agent has been identified, the behavior of many other liquids may be predicted from the relative position of the reference polymer and porogenic agent in published tables, within the accuracy of such published information. Furthermore, if the solubility parameter of a given polymer occupies an intermediate position in these tables, solvents with both higher or lower parameters may be found to be effective.

The macroporous copolymer's structure is characterized by the presence of regions of densely packed polymer chains separated by pores, often referred to as mesopores (50 to 200 Å) and macropores (>200 Å). The nonuniformity of the internal structure of a swollen macroporous copolymer causes the copolymer to appear opaque because of its ability to refract light. If inert diluents or swelling solvents are removed from the macroporous copolymer, for example by subjecting the copolymer to vacuum or steam distillation, then in many instances the pores will collapse from the stress of internal pressures created by increased attractive forces among the regions of packed polymer chains, and the copolymer would then appear transparent or translucent. A type of macroporous copolymer which retains a porous structure even upon removal of inert diluents or swelling solvents is described in U.S. Pat. No. 4,382,124 and is called "Macroreticular" copolymers. They are characterized by their opaque appearance, regardless of whether or not the copolymer is examined in the presence or absence of inert diluents or swelling solvents.

Members of the other class of porogenic agents exert a swelling action on the copolymers and are solvents for the monomer mixture. Such agents are typically employed in the preparation of isoporous copolymer beads. Examples of such agents include known aromatic solvents and chlorinated solvents such as ethylene dichloride and methylene chloride. Preferably, toluene is used as the swelling porogenic agent. The preferred porogenic agent and the amount of such agent is dependent on the type of monomer used and the type of porosity characteristics desired.

The gellular copolymer beads may be prepared by conventional suspension polymerization techniques such as those taught in U.S. Pat. No.4,564,644.

Processes for preparing "macroreticular" copolymers of a monovinyl aromatic monomer and a crosslinking monomer, which have been post-crosslinked with a polyfunctional alkylating or acylating compound in a swollen state in the presence of a Friedel-Crafts catalyst, are disclosed in U.S. Pat. Nos. 4,191,813 and 4,263,407, herein incorporated by reference. Any Friedel-Crafts-type catalyst may be utilized to catalyze the post-crosslinking reaction, such as the acidic metal halides including aluminum chloride, stannic chloride, aluminum bromide, boron fluoride, zinc chloride, ferric chloride and the like. The catalyst will be effective in amounts ranging from about 0.001 to about 50 percent by weight based on weight of polymeric material, preferably ranging from about 5 to about 30 percent by weight. The optimum amount will depend upon the reactants and conditions selected for carrying out the reaction.

In U.S. Pat. Nos. 4,191,813 and 4,263,407, the macroreticular copolymers are referred to as "macronet polymeric adsorbents". A macronet polymeric adsorbent can be functionalized with hydrophilic groups using conventional methods for functionalizing copolymers which are prepared via suspension polymerization with ion exchange groups. For example, the polymeric adsorbent can be functionalized by aminating a chloromethylated polymeric adsorbent with either dimethylamine, trimethylamine, or dimethylethanolamine, depending on whether weak base or strong base functionality is desired. Similarly, the -macronet polymeric adsorbent can be functionalized by sulfonation. Alternatively, a chloromethylated polymeric adsorbent can be functionalized by solvolysis at elevated temperatures.

The most preferred process for preparing adsorbent resins which have been post-crosslinked in a swollen state in the presence of a Friedel-Crafts catalyst is described in East German Patent No. DD 249,274 A1, herein incorporated by reference. When post-crosslinking a copolymer, preferably a macroporous copolymer, the copolymer is contacted with a swelling solvent, as chlorinated solvents, e.g. ethylene dichloride or methylene chloride. This patent describes post-crosslinking a "solvent-free", chloromethylated macroporous copolymer of styrene and divinylbenzene. After chloromethylation, the copolymer is first contacted with a washing agent, such as methanol, and then the washing agent is removed by either drying the washed copolymer or extracting the washing agent with the swelling solvent used for the subsequent post-crosslinking reaction.

Methods of chloromethylation of the copolymers are well known in the art as illustrated in *Ion* Exchange, supra, p. 53 and U.S. Pat. No. 2,642,417; 2,960,480; 2,597,492 and 3,311,602. Generally the chloromethylation reaction consists of reacting the copolymer bead with a haloalkylating agent, preferably bromomethyl methyl ether, chloromethyl methyl ether, or a mixture of formaldehyde and hydrochloric acid in the presence of a Friedel-Crafts catalyst.

After post-crosslinking the chloromethylated copolymer, the copolymer can be functionalized with hydrophilic groups in the conventional manner, thereby producing a useful adsorbent resin. If it is desirable, functionalization could also be performed before post-crosslinking the copolymer. Although the East German patent only describes a process for preparing adsorbent resins from macroporous copolymers of styrene and divinylbenzene, the process can be used to prepare other copolymers of a monovinyl aromatic monomer and a crosslinking monomer.

More specifically, the post-crosslinked macroporous resin can be functionalized by using tertiary amines such as trimethylamine, triethylamine, tributylamine, dimethylisopropanolamine, ethylmethyl propylamine, dimethylamiaminating and the like as aminating agents, thereby producing strong-base anion exchange resins. Likewise, weak-base anion exchange resins may be prepared using primary and secondary amines such as dimethylamine, diethylamine, ethylenediamine and diethylenetriamine and the like. Regardless of the method used for functionalizing the post-crosslinked macroporous copolymer, after functionalization, the adsorbent resin's hydrophilic character increases its efficiency to adsorb bitter components and acid if so desired. Before contacting the adsorbent resin with the citrus juice, the resin can be first treated with either an acidic, basic, or salt solution.

Preferably, the macroporous copolymer is first chloromethylated, then post-crosslinked and finally aminated with either dimethylamine, trimethylamine or dimethylethanolamine. Most preferably, the post-crosslinked macroporous copolymer is functionalized by aminating the chloromethylated copolymer with dimethylamine. Using conventional ion exchange terminology, an adsorbent resin functionalized in this manner and then contacted with an acidic solution is thus converted to its acid form, which is the preferred form desired for removing bitter components from many citrus juices.

Post-crosslinking in a swollen state displaces and rearranges polymer chains, causing an increase in the number of micropores ($<50\text{Å}$ diameter) and mesopores. This increases porosity and surface area and decreases average pore size. Just as significantly, post-crosslinking also imparts rigidity to the polymer, which reduces its tendency to shrink or swell upon contact with an aqueous solution (often referred to in the ion exchange art as the "shrink/swell") and reduces its dry weight capacity when functionalized, which is an indication of its ion exchange capacity. These properties as characterized above increase the capacity of the adsorbent resin to adsorb bitter components, increase its permeability to citrus juices, and increase its physical and dimensional stability.

Furthermore, the reduced shrink/swell and dry weight capacity of the adsorbent resin, which post-crosslinking induces, is conducive to simple inexpensive and efficient regeneration once the bitter components are loaded onto the resin. The reduced dry weight capacity allows desorption of the bitter components from the loaded resin with a dilute base. Concentrated bases or acids are unnecessary for regeneration or cleaning. The reduced shrink/swell property allows the resin to maintain sufficient porosity to minimize entrapment of bitter components, and this property in combination with the reduced dry weight capacity reduces the tendency of the resin to retain the bitter components during regeneration.

The post-crosslinking of the resins results in a ratio of methylene bridges to phenyl groups of about 0.1 to about 0.9:1, preferably from about 0.4 to about 0.8:1. The resins after amination generally exhibit a dry weight capacity ranging up to about 3 0 meq/g, preferably from about 1.0 to about 2.0 meq/g. The lower dry weight capacities compared to conventional resins allow the resins to be regenerated with lower amounts and concentrations of the basic regenerants. The lower dry weight capacity of the resin also reduces the amount of citric acid removed from the citrus juices.

The adsorbent resin preferably has a surface area of about 150 to about 2100 square meters per gram of dry adsorbent resin ($m^2/g$), more preferably about 700 to about 1400 $m^2/g$. Surface area is measured by BET nitrogen adsorption techniques. Porosity ranges from about 0.10 to about 0.70 cubic centimeters of pore volume per cubic centimeter of resin (cc/cc), preferably about 0.43 to about 0.58 cc/cc, as calculated from BET nitrogen adsorption techniques. The porosity contributed by micropores ranges from about 30 to about 100 percent, preferably about 30 to about 50 percent, depending on the resin characteristics. The macropores and mesopores which contribute to the increased porosity, typically have a diameter range from about 30 Å to about 1,000 Å preferably from about 30 Å to about 250 Å. The average macropore diameter ranges from about 200 Å to about 300 Å. The micropores generally range in diameter from about 5 Å to about 30 Å and more preferably from about 5 Å to about 20 Å.

Percent shrink/swell ranges below about 15 percent, more preferably below about 7 percent, and most preferably below about 4-percent. Percent shrink/swell is determined by measuring the volume expansion or contraction of the adsorbent resin when subjected to hydration or a change in ionic form. The dry weight capacity, determined according to conventional methods used for characterizing ion exchange resins, ranges from greater than zero to about 4.0 milliequivalent per gram (meq/g), preferably from greater than about zero to about 2.0 meq/g. If the macroporous copolymer is functionalized by solvolysis, for example by contact with water or an alcohol, then the dry weight capacity is essentially zero.

The adsorbent resin can be used in the form of beads, pellets, fibers or any other form desirable for bittering citrus juices. If the adsorbent resin is used in the form of beads, bead size ranges preferably from about 10 to about 1000 microns ($\mu$), more preferably from about 100 to about 800 $\mu$, and most preferably from about 300 to about 800 $\mu$.

Examples of citrus juices which may be treated by the practice of the present invention include grapefruit, Japanese Summer Orange, Navel orange, water extracted soluble orange solids, early season tangerines, Valencia, Temple and Murcot oranges, lemon and other juices which contain limonoids. The term "citrus juice" is intended to include not only whole juices extracted from citrus fruit but also juice that has been further processed by methods such as concentration, dilution, blending, drying, etc. The term also includes juices which may have been treated by the addition of preservatives, coloring, sweeteners, flavorings, and the like, it also includes juices which have been deacidified. Unless otherwise stated the term citrus juice includes both the serum and the pulp sediments which may be removed in a centrifuge. By serum is meant to be a sediment free juice.

Before contacting the adsorbent resin with the citrus juice, the resin can be first treated with a basic, salt or acidic solution, e.g. the basic solution can be sodium hydroxide, potassium hydroxide, ammonium hydroxide or sodium carbonate: the salt solution can be sodium citrate, sodium chloride, or sodium citrate: the acid can be hydrochloric acid, sulfuric acid, citric acid, or acetic acid, or such similar solutions can be used.

The adsorptive resin and the citrus juice to be debittered may be contacted using any conventional means which results in the intimate contact of the resin and the citrus juice. Suitable methods include fluidized beds, stirred tanks, batch tanks, and concurrent and countercurrent flow columns. The contacting may occur batchwise, semi-batchwise, semi-continuously or continuously. Preferably, the resin and citrus juice are contacted continuously in a column in which the resin is laterally confined. When contacted in a column or fluidized bed the flow of the citrus juice may be either in an upflow or downflow direction.

The amount of residence time during which the adsorbent resin and the citrus juice are allowed to remain in contact is largely dependent upon the type of resin used, the amount of debittering desired, the amount of bitter components initially present in the juice, the amount of resin used, the temperature, and the pH of the juice. The primary factor in determining the contact time is the desired level of debittering. It is preferred that the level of original bitter components be reduced to a level below about 10 ppm, more preferably below about 6 ppm, and most preferably below about 2 ppm. Generally, it is desirable to remove at least 50 percent of the bitter components contained in the juice. This level of debittering is generally observed when the juice and the resin are allowed to be contacted for a period ranging from about 1 minute to about 60 minutes, more preferably from about 5 minutes to about 40 minutes, and most preferably from about 10 minutes to about 30 minutes. In addition to removing bitter components, another advantage to employing this method is that while the bitter components are removed from the juice, the citric acid is not substantially removed from the juice. Furthermore when the adsorbent resin is pretreated with an acid solution, the resin removes less than about 20 percent of the citric acid from the juice.

After the resins become exhausted (i.e. loaded with bitter components) it is necessary to place the resins back in a form in which they are capable of removing additional amounts of the bitter components. The point at which the resins become exhausted is determined by the maximum amount of bitter components which are allowed to remain in the treated juice. Once it is determined that the process is not reducing the bitter components to the desired level it is necessary to desorb the bitter component from the resin.

Desorption of the bitter components from the resin is accomplished by contacting the resin with an amount of a basic solution which is effective in removing a substantial amount of the bitter components which have been adsorbed by the resin. The level of concentration of the basic solution is not as critical as the amount of the basic solution which is used. The amount of basic solution is that amount which is capable of desorbing at least about 60 percent, more preferably at least about 75 percent, and most preferably at least about 85 percent of the bitter components adsorbed by the resin. Suitable basic solutions include sodium hydroxide, ammonium hydroxide, potassium hydroxide or sodium carbonate. A typical basic solution useful for the desorption of the bitter components comprises about 4 percent sodium hydroxide.

The temperature should be maintained at a level which does not adversely affect the quality of the citrus juice being debittered. Generally, the temperature at which the adsorptive resin and the juice are contacted may range from about zero degrees centigrade to about 40° C, more preferably from about 10° C to about 40° C, and most preferably from about 15° C to about 30° C.

The amount of resin used is largely dependent on the equipment configuration and the level of debittering desired. Suitable amounts of citrus juice that can be treated by the resin range from about 10 to about 1000 kg juice/kg resin, more preferably from about 100 to about 500 kg juice/kg resin, and most preferably about 150 to about 450 kg juice/kg resin.

The pH of the citrus juice which is contacted with the adsorbent resin is generally determined by the process steps which have occurred prior to the debittering step. The pH at which the juice and the resin are contacted is preferably a value which normally occurs in the extraction process. In this method of debittering citrus juices, the pH of the juice is not significantly altered, even if the resin is pretreated with a base. Generally the difference between the pH of the citrus juice before and after contact with the adsorbent resin is less than 2 pH units, preferably less than 1 pH unit if a salt or acid solution is used to pretreat the resin prior to contact with the juice.

A suitable manner of preparing copolymer beads which can be appropriately used in the present invention is illustrated as follows:

Preparation of Macroporous Copolymer Beads

A macroporous copolymer bead is prepared by the suspension polymerization of a mixture of styrene and divinylbenzene (DVB). To a 3-liter pressure vessel fitted with a mechanical stirrer, thermocouple and a recirculating silicone oil heating and cooling system is charged a pre-mixed aqueous phase consisting of 1,189 g of deionized water and 5.36 g of cellulose suspending agent. With the agitation turned off, a pre-mixed organic phase consisting of 450.7 g of styrene, 49.3 g of 55.5 percent divinylbenzene (DVB), 293.6 g $C_7$-$C_8$ aliphatic hydrocarbon diluent, and 2.5 g of peroxide initiator is added to the reactor. The agitator is started at 220 rpm 30 minutes prior to heating the reactor to 80° C. After maintaining this temperature for 5 hours, the temperature is raised to and maintained at 110° C for another 5 hours. After cooling, the copolymer is removed from the reactor and the mixture subjected to steam distillation to remove the diluent. The beads which have had the diluent removed are recovered and air dried for 16 hours. The resulting product is a macroporous copolymer bead of styrene and divinylbenzene monomers.

Haloalkylation of the Copolymer Beads

To a 2-liter, 3-necked flask equipped with a stirrer, reflux condenser connected to a caustic scrubber, thermometer and a recirculating hot water heating system is charged 150 g of one of the copolymer beads prepared as described above, 800 ml of chloromethyl methyl ether (CMME) and 50 g of ferric chloride. The reactor is heated to 52° C for 2.5 hours. After cooling the reactor, the CMME is quenched three times by washing with methanol. The beads are then allowed to stand for two hours after the final methanol wash before filtering and air-drying. Each type of copolymer bead (gellular or macroporous) may be chloromethylated by the above procedure.

Post-Crosslinking of the Haloalkylated Copolymer

To a 2-liter, 3-necked flask equipped with a stirrer, reflux condenser connected to a caustic scrubber, thermometer and a recirculating hot water heating system is added 200 g of the macroporous chloromethylated copolymer described above and 800 g of ethylene dichloride (EDC). The reactor is stirred and heated slowly to 85° C to distill off any remaining moisture prior to post-crosslinking. After cooling the reactor down to 20° C, 12 g of aluminum chloride are added and the reactor is heated to 83° C for 6 hours. After cooling the reactor back down to 25° C, the aluminum chloride is quenched with 100 g of water. The agitation is continued for an additional hour after quenching. The post-crosslinked macroporous copolymer is separated. The beads are washed twice with methanol followed by two water washes prior to amination.

Functionalization of the Post-crosslinked Macroporous Copolymer

To a 1-liter Parr reactor is added 400 ml of the post-crosslinked macroporous copolymer as prepared above, 100 g of 40 percent dimethylamine, 50 g of 50 percent caustic, and 100 g water. The reactor is sealed and heated to 90° C for 5 hours with agitation. The reactor is then cooled to 25° C and the adsorbent resin is removed from the reactor and the liquor decanted. The resin is reslurried in water and acidified using concentrated hydrochloric acid. After standing for 1 hour, the liquor is decanted and the resin is washed with water. The resin is reslurried in water and enough caustic is added to make the slurry basic. After standing for another hour, the resin is backwashed with deionized water until the effluent is neutral (pH about 7). The adsorbent resin is isolated and air dried.

The following examples are intended to illustrate the present invention and are not deemed to limit the scope of the invention.

EXAMPLE 1

A 50 ml sample of a macroporous adsorbent resin prepared by the process discussed hereinbefore is loaded into a glass column of 2.5 cm inner diameter. The resin exhibits porosity of 1.12 cc/gm when measured by BET nitrogen porosimetry. The pore sizes range from about 70-100 Å and the surface area is 866 $m^2$/gm. The resin is treated with an excess of 1N hydrochloric acid, and rinsed with deionized water. The resin is then treated with an excess of 1N sodium hydroxide and again rinsed with deionized water. This acid-wash-base-wash cycle is repeated two more times. The resin is then treated with a solution containing 4 percent sodium hydroxide. The resin is then washed with deionized water.

The resin is then transferred to a 500 ml volumetric flask. The water is decanted off using a stainless steel mesh over the neck of the flask to prevent resin loss. One bed volume (50 ml) of single strength navel orange juice (approx. 11% Brix,: Brix is the percent solids in a sample) is added, and the contents of the flask are swirled continuously for ten minutes. The juice is then decanted off using the stainless steel mesh and retained. Another two bed volumes (100 ml) of juice is added to the flask. The contents are again swirled for 10 minutes, and the juice decanted. An additional 13, 100 ml aliquots of juice are added, swirled for ten minutes, decanted, and collected until a total of 1,450 ml have been treated. The resin is then transferred back to a small glass column and rinsed with deionized water. The resin is then regenerated with an excess of solution containing 4 percent sodium hydroxide and 10 percent sodium citrate, and rinsed with deionized water. The resin is then transferred back to the 500 ml volumetric flask and the above procedure for adding 100 ml aliquots of juice and swirling for ten minutes is repeated until a total of 23 bed volumes (1,150 ml) have been treated.

The limonin content of the juice collected in the second batch of juice treated is determined using BITTERDETEK TM assay. Paplo Jourdan, R. Mancell D. Oliver, E. L. Weiler, "Competitive Solid Phase Enzyme Linked Immunoassay for the Quantification of Liminon in Citrus" *Analytical Biochemistry*, vol. 138, (1984), pp.19-24.

The results are summarized in Table I.

TABLE I

| Bed Volumes of Juice | Limonin Concentration (ppm) |
|---|---|
| 0 (untreated) | 40.5 |
| 2-3 | <1.0* |
| 4-5 | 1.3 |
| 10-11 | 4.9 |
| 16-17 | 5.3 |
| 22-23 | 7.9 |

*The BITTERDETEK TM system has a recommended lower threshold of 1.0 ppm.

EXAMPLE 2

The same 50 ml sample of resin as used in Example 1 is transferred to a glass column with an I.D. of about 1 inch. The resin is washed with deionized water. The resin is then regenerated with a solution containing 4 percent sodium hydroxide, and then washed again with deionized water.

The resin is then transferred to a one-inch I.D. glass tube. The tube has a sintered glass plug at the base to hold the resin, and is of the type commonly used in the art for experimental continuous flow tests. A single strength navel orange juice is pumped upflow through the tube at a rate of six bed volumes per hour (5 ml per minute). Samples of the treated juice are taken every five bed volumes (250 ml) until 50 bed volumes (2,500 ml) of juice have been treated.

The samples are treated by the same method of Example 1 and the results are summarized in Table II.

TABLE II

| Bed Volumes of Juice | Limonin Concentration (ppm) |
|---|---|
| 0 (untreated) | ~40 |
| 5 | 6.5 |
| 10 | 5.4 |
| 15 | 5.9 |
| 20 | 8.7 |
| 25 | 11.4 |
| 30 | 17.3 |
| 35 | 15.2 |
| 40 | 16.0 |
| 50 | 17.2 |

EXAMPLE 3

A 50 ml sample of resin is prepared by the process referred to in Example 1, except that after addition of the aluminum chloride catalyst the reactor is heated to 83° C for 2 hours rather than 6 hours.

The process of Example 1 is repeated on the resin sample and the results are summarized in Table III.

TABLE III

| Bed Volumes of Juice | Limonin Concentration (ppm) |
|---|---|
| 0 (untreated) | 40.5 |
| 2-3 | 1.0 |
| 4-5 | 2.4 |
| 10-11 | 6.6 |
| 16-17 | 11.2 |
| 22-23 | 13.8 |

The data summarized in the Tables I-III illustrates the effectiveness of the present process for removing limonins from navel orange juices.

EXAMPLE 4

A sample of a macroporous adsorbent resin prepared by the process referred to in Example 1 is employed herein, except that in preparing the resin, an iron chloride catalyst is used and the reactor is heated to 80° C for 4 hours. A 50 ml sample of the adsorbant resin is loaded into a glass column of 1 inch inner diameter. The resin is contacted with a 5 percent hydrochloric acid solution for 45 minutes and then rinsed with deionized water. The resin is then contacted with a 4 percent sodium hydroxide solution for 45 minutes and then washed with deionized water. The acid-water-base-water cycle is repeated twice more in order to condition the resin.

The resin is then transferred to a one-inch I. D. glass tube. The tube has a sintered glass plug at the base to hold the resin, and is of the type commonly used in the art for experimental continuous flow tests. A sample of navel orange juice is filtered to −80 mesh/170μ using an extra coarse grade gas dispersion tube to simulate commercially centrifuged juice.

The filtered juice sample is then contacted with the resin downflow at flow rates of 2, 4, 6, 8, and 10 bed volumes/hour. The recycle procedure used at each flow rate was as follows. About 40 bed volumes (bv) of juice were contacted with the bed at the designated flow rate. Then the bed was washed with 1 ½ bv of water and backwashed with water to obtain 100 volume percent bed expansion (about 6 bv water upflow). The bed was next contacted with 3 bv of 1N NaOH at a rate to provide about 45 minutes of contact time to regenerate the bed. The bed was then rinsed with 10 bv of water and the cycle repeated. In the case of the experiment done at 10 bed volumes/hour, the cycle was repeated over 30 times. This demonstrates the excellent ability of this resin system to be regenerate.

Samples of the treated juice are taken to determine when less than 6 ppm of limonin is present in the juice. The limonin content is determined as discussed more fully hereinbefore in Example 1. The juice was flowed through the column until a bitterness component of 6 ppm occurred. The number of bed volumes of the juice which was treated prior to the bitter components break through of 6 ppm are summarized in Table IV.

TABLE IV

| Flowrate of Juice (Bed volumes/hour) | Breakthrough of limonin @ 6 ppm (Bed volumes) |
|---|---|
| 2 | >42 |
| 4 | 25 |
| 6 | 20 |
| 8 | 16 |
| 10 | 14 |

The data in Table IV illustrates the effectiveness of the present invention in removing limonin from orange juice in a downflow, recycled application.

EXAMPLE 5

At room temperature, 22° C, 500 ml of freshly extracted navel orange juice is placed into a 1,000 ml beaker. 100 Milliliters, tapped volume, of macroporous absorbent resin as used in example 4, in the hydrogen chloride form as described herein, is quantitatively added to the juice and stirred with a magnetic stirrer. The stirrer was turned off 3 minutes before sampling in order to let the resin settle from the juice. 25 Milliliters aliquots were taken at 15 minutes, 30 minutes and 60 minutes elapsed time. The aliquots were then boiled for 60 minutes to set the limonin content. By setting the limonin, the limonin precursors are converted to limonin. The limonin content of the samples was measured by high performance liquid chromatography (HPLC). The results of the experiment are below:

| Sample | Time (minutes) | Limonin (ppm) |
|---|---|---|
| 0 | 0 | 18.2 |
| 1 | 15 | 4.6 |
| 2 | 30 | 2.8 |
| 3 | 60 | <1.0* |

*The BITTERDETEK ™ system has a recommended lower threshold of 1.0 ppm.

EXAMPLE 6

At room temperature, 22° C, 500 ml of freshly extracted navel orange juice is placed into a 1,000 ml beaker. 100 Milliliters, tapped volume, of macroporous absorbent resin as used in example 4, in the freebase form as described herein, is quantitatively added to the juice and stirred with a magnetic stirrer. The stirrer was turned off 3 minutes before sampling in order to let the resin settle from the juice. 25 Milliliters aliquots were taken at 15 minutes, 30 minutes and 60 minutes elapsed time. The aliquots were then heated for 60 minutes to set the limonin content. The limonin content of the samples was measured by high performance liquid chromatography. The results of the experiment are below:

| Sample | Time (minutes) | Limonin (ppm) |
|---|---|---|
| 0 | 0 | 26.8 |
| 1 | 15 | 6.2 |
| 2 | 30 | 2.9 |
| 3 | 60 | 2.4 |

EXAMPLE 7

At room temperature, 22° C, 500 ml of freshly extracted navel orange juice is placed into a 1,000 ml beaker. 100 Milliliters, tapped volume, of macroporous absorbent resin as used in example 4, in the freebase form, is quantitatively added to the juice and stirred with a magnetic stirrer. The stirrer was turned off 3 minutes before sampling in order to let the resin settle from the juice. 50 Milliliter aliquots were taken at 30 minutes, 45 minutes and 60 minutes elapsed time. The aliquots were then heated for 60 minutes to set the limonin content. The limonin content of the samples was measured by high performance liquid chromatography. The results of the experiment are below:

| Sample | Time (minutes) | Limonin (ppm) |
|---|---|---|
| 0 | 0 | 26.8 |
| 1 | 30 | 3.1 |
| 2 | 45 | 1.4 |
| 3 | 60 | 0.9 |

Since Examples 5-7 involved treating freshly extracted juice, these examples demonstrate the claimed method's ability to remove the limonin precursor, limonin α-ring lactone.

In Examples 8-10 the following procedures were used: The citric acid content was determined by titration with 0.1N sodium hydroxide, to an end-point of 8.2 pH, and the Brix level was measured using an Abbe Mark II refractometer.

EXAMPLE 8

In this example, two samples were prepared as follows Sample A was the resin as prepared according to the procedures described in Example 1, Sample B was the resin as prepared according to the procedures described in Example 3. Both samples were treated with a base, NaOH, before use and the limonin content of the samples was measured by HPLC. Results are described in Table V A-B.

EXAMPLE 9

In this example, two samples were prepared as follows: Sample A was the resin as prepared according to the procedures described in Example 1, Sample B was the resin as prepared according to the procedures described in Example 3. Both samples were treated with a salt, sodium citrate, before use and the limonin content of the samples was measured by HPLC. Results are described in Table VI A-B.

EXAMPLE 10

In this example, two samples were prepared as follows: Sample A was the resin as prepared according to the procedures described in Example 1, Sample B was the resin as prepared according to the procedures described in Example 3. Both samples were treated with an acid, H$_2$SO$_4$, before use and the limonin content of the samples was measured by HPLC. Results are described in Table VII.

TABLE V(A)

Example 8 - Sodium Hydroxide Rinse

| Bed Volumes of Juice | Limonin, ppm | | | Brix | | | Percent Citric Acid | | |
|---|---|---|---|---|---|---|---|---|---|
| | Dowex* 66 | Sample A | Sample B | Dowex* 66 | Sample A | Sample B | Dowex* 66 | Sample A | Sample B |
| 0 | 27.3 | 27.3 | 27.3 | 13.2 | 13.2 | 13.2 | 0.94 | 1.05 | 1.03 |
| 2-4 | 11.9 | 4.9 | 6.7 | 11.6 | 11.3 | 9.0 | 0.18 | 0.23 | 0.17 |
| 4-6 | 12.8 | 12.3 | 10.7 | 12.3 | 12.2 | 8.6 | 0.34 | 0.34 | 0.27 |
| 10-12 | 13.2 | 16.3 | 10.4 | 12.9 | 12.8 | 10.9 | 0.47 | 0.65 | 0.67 |
| 16-18 | 11.3 | 10.8 | 12.4 | 12.9 | 13.0 | 11.0 | 0.58 | 0.71 | 0.81 |
| 22-24 | 14.3 | 17.1 | 13.2 | 12.9 | 13.0 | 12.6 | 0.58 | 0.83 | 0.97 |

TABLE V(B)

Example 8 - Sodium Hydroxide Rinse

| Bed Volumes of Juice | pH | | |
|---|---|---|---|
| | Dowex* 66 | Sample A | Sample B |
| 0 | 3.5 | 3.6 | 3.7 |
| 2-4 | 7.1 | 5.0 | 5.1 |
| 4-6 | 6.8 | 4.7 | 4.5 |
| 10-12 | 6.3 | 4.3 | 4.0 |
| 16-18 | 6.3 | 4.1 | 3.8 |
| 22-24 | 6.2 | 3.9 | 3.7 |

Results - As seen in the data above, the adsorbent resin treated with a sodium hydroxide rinse has larger capacity for removing the limoin from the juice and changes in the pH of the juice was less when using the adsorbent resin.

TABLE VI(A)

Example 9 - Sodium Citrate Rinse

| Bed Volumes of Juice | Limonin, ppm | | | Brix | | | Percent Citric Acid | | |
|---|---|---|---|---|---|---|---|---|---|
| | Dowex* 66 | Sample A | Sample B | Dowex* 66 | Sample A | Sample B | Dowex* 66 | Sample A | Sample B |
| 0 | 40.5 | 40.5 | 40.5 | 11.0 | 11.0 | 11.0 | 0.94 | 0.94 | 0.94 |
| 2-3 | 18.7 | <1 | <1 | 9.6 | 9.1 | 9.2 | 0.12 | 0.14 | 0.18 |
| 4-5 | 25 | 2.4 | 1.3 | 10.3 | 10.0 | 10.2 | 0.22 | 0.22 | 0.32 |
| 10-11 | 29 | 6.6 | 4.9 | 10.5 | 10.5 | 11.0 | 0.41 | 0.42 | 0.59 |
| 16-17 | 27 | 11.2 | 5.3 | 11.0 | 10.8 | 11.2 | 0.52 | 0.6 | 0.74 |
| 22-23 | 28 | 13.8 | 7.9 | 11.0 | 11.0 | 10.9 | 0.63 | 0.72 | 0.86 |

TABLE VI(B)

Example 9 - Sodium Citrate Rinse

| Bed Volumes of Juice | pH | | |
|---|---|---|---|
| | Dowex* 66 | Sample A | Sample B |
| 0 | 3.8 | 3.8 | 3.8 |
| 2-3 | 5.4 | 5.2 | 5.0 |
| 4-5 | 4.9 | 4.9 | 4.6 |
| 10-11 | 4.4 | 4.4 | 4.2 |
| 16-17 | 4.2 | 4.1 | 4.0 |
| 22-23 | 4.1 | 4.0 | 3.9 |

Results - As seen in the data above, the adsorbent resin treated with a sodium citrate rinse has larger capacity for removing limonin, and removes less citric acid, while maintaining the pH of the juice.

TABLE VII

Example 10 - Sulfuric Acid Rinse

| Bed Volumes of Juice | Limonin, ppm | | Brix | | Percent Citric Acid | | pH | |
|---|---|---|---|---|---|---|---|---|
| | Dowex* 66 | Sample B | Dowex 66 | Sample B | Dowex* 66 | Sample B | Dowex* 66 | Sample B |
| 0 | 16.8 | 14.9 | 13.7 | 13.6 | 1.07 | 1.08 | 3.6 | 3.6 |
| 2-4 | 10.1 | 4.1 | 12.1 | 11.4 | 0.60 | 0.45 | 3.3 | 3.4 |
| 4-6 | 13.0 | 3.7 | 13.0 | 12.7 | 0.75 | 0.68 | 3.3 | 3.5 |
| 10-12 | 13.3 | 7.2 | 13.4 | 13.5 | 0.91 | 1.01 | 3.4 | 3.5 |
| 16-18 | 13.6 | 7.1 | 13.5 | 13.5 | 0.95 | 1.08 | 3.4 | 3.6 |
| 22-24 | 13.2 | 7.7 | 13.5 | 13.5 | 1.01 | 1.08 | 3.5 | 3.6 |

Results - As seen in the data above, the adsorbent resin treated with a sulfuric acid rinse has a larger capacity for removing the limonin from the juice; removes less citric acid; and the changes in the pH in the juice are less when using the adsorbent resin.

What is claimed is:

1. A process for removing bitter components from citrus juices which comprises: contacting a citrus juice with an effective amount of an adsorbent resin so as to adsorb the bitter components from said citrus juice onto said adsorbent resin, wherein said adsorbent resin is derived from a copolymer of a monoethylenically unsaturated monomer and a crosslinking monomer, where the copolymer has been post-crosslinked in the swollen state in the presence of Friedel-Crafts catalyst in a swollen state and functionalized with hydrophilic groups.

2. The process of claim 1 wherein the crosslinking monomer is a polyvinylidene monomer.

3. The process of claim 2 wherein the polyvinylidene monomer is selected from the group consisting of divinylbenzene, trivinylbenzene or ethylene glycol diacrylate.

4. The process of claim 1 wherein the monoethylenically unsaturated monomer is a monovinyl aromatic monomer.

5. The process of claim 4 wherein the monovinyl aromatic monomer is styrene or a derivative of styrene, vinyltoluene, vinylbenzyl chloride, vinylbenzyl alcohol, or vinylnaphthalene.

6. The process of claim 1 wherein the copolymer is a macroporous copolymer.

7. The process of claim 6 wherein the macroporous copolymer contains from about 1 to about 45 weight percent of the crosslinking monomer.

8. The process of claim 7 wherein macroporous copolymer contains up to about 99.75 weight percent styrene with the balance divinylbenzene.

9. The process of claim 7 wherein the adsorbent resin contains from about 4 to about 8 weight percent of the crosslinking monomer.

10. The process of claim 1 wherein the copolymer is a gellular copolymer.

11. The process of claim 10 wherein the adsorbent resin contains from about 0.25 to about 15 weight percent of the crosslinking monomer.

12. The process of claim 1 wherein the copolymer is chloromethylated.

13. The process of claim 1 wherein the copolymer is post-crosslinked with a polyfunctional alkylating or acylating compound.

14. The process of claim 1 wherein the post-crosslinked macroporous copolymer is functionalized with dimethylamine, trimethylamine or dimethylethanolamine.

15. The process of claim 1 wherein the post-crosslinked copolymer is functionalized by solvolysis.

16. The process of claim 1 wherein the post-crosslinked copolymer is functionalized by sulfonation.

17. The process of claim 1 wherein the adsorbent resin has a surface area of from about 150 to about 2100 m$^2$/g.

18. The process of claim 17 wherein the adsorbent resin has a surface area of from about 700 to about 1400 m$^2$/g.

19. The process of claim 1 wherein the adsorbent resin has a porosity of from about 0.10 to about 0.70 cc/cc.

20. The process of claim 19 wherein the adsorbent resin has a porosity of from about 0.43 to about 0.58 cc/cc.

21. The process of claim 1 wherein the adsorbent resin exhibits a percent shrink/swell below about 7 percent.

22. The process of claim 21 wherein the adsorbent resin exhibits a percent shrink/swell below about 4 percent.

23. The process in claim 1 wherein the dry weight capacity of the adsorbent resin ranges from greater than zero to about 3.0 meq/g.

24. The process in claim 1 wherein the dry weight capacity of the adsorbent resin ranges from greater than zero to about 2.0 meq/g.

25. The process of claim 23 wherein the adsorbent resin contains pores with diameters from about 30 Å to about 1,000 Å.

26. The process of claim 1 wherein the citrus juice is selected from the group consisting of orange juices and grapefruit juices.

27. The process of claim 26 wherein prior to contacting the adsorbent resin with orange juices or grapefruit juices, the adsorbent resin is pretreated with a solution selected from the group consisting of a base, salt and acid solution.

28. The process of claim 27 wherein the adsorbant resin when pretreated with an acid solution removes less than about 20 percent of the citric acid contained in the citrus juice.

29. The process of claim 26 wherein the citrus juice does not contain pulp.

30. The process of claim 26 wherein the citrus juice is a navel orange juice.

31. The process of claim 1 wherein at least 50 percent of the bitter components are removed from the citrus juice after contact with the adsorbent resin.

32. The process of claim 1 wherein the citrus juice and adsorbent resin are contacted in a confined vessel.

33. The process of claim 1 further comprising the step of desorbing the bitter components from the adsorbent resin by contacting the adsorbent resin with a basic solution.

34. The process of claim 33 wherein the basic solution is selected from the group consisting of sodium hydroxide, ammonium hydroxide, potassium hydroxide and sodium carbonate.

35. The process of claim 1 wherein the difference between the pH of the citrus juice before and after contact with the adsorbent resin is less than 2 pH units.

* * * * *

UNITED STATES PATENT AND TRADEMARK OFFICE
CERTIFICATE OF CORRECTION

PATENT NO. : 4,965,083

DATED : October 23, 1990

INVENTOR(S) : Seth I. Norman; Richard T. Stringfield; Christopher C. Gospill

It is certified that error appears in the above-identified patent and that said Letters Patent is hereby corrected as shown below:

Column 3, lines 15-16, "ortho-, meta-, and para-ethyl styrenes vinyltoluene: ethylvinylbenzene: vinylnaphthalene: vinylbenzyl chlo-" should correctly appear --ortho-, meta-, and para-ethyl styrenes; vinyltoluene; ethylvinylbenzene; vinylnaphthalene; vinylbenzyl chlo- --.

Column 4, line 7, "4,419,242:" should correctly appear --4,419,242;--.

Column 6, line 29, "thylamiaminating" should correctly appear --thylaminoethanol--.

Column 7, line 19, "3 0 meq/g" should correctly appear --3.0 meq/g--.

Column 8, line 19, "carbonate:" should correctly appear --carbonate;--.

Column 8, line 20, "citrate:" should correctly appear --citrate;--.

Column 13, line 5, "regenerate." should correctly appear --regenerated.--.

Column 14, line 47, "lows Sample A" should correctly appear --lows: Sample A--.

UNITED STATES PATENT AND TRADEMARK OFFICE
CERTIFICATE OF CORRECTION

PATENT NO. : 4,965,083

DATED : October 23, 1990

INVENTOR(S) : Seth I. Norman; Richard T. Stringfield, Christopher C. Gospill

It is certified that error appears in the above-identified patent and that said Letters Patent is hereby corrected as shown below:

Column 15-16, line 26, in TABLE VII, under the column Brix, "Dowex 66" should correctly appear --Dowex* 66--.

Signed and Sealed this

Thirtieth Day of June, 1992

Attest:

DOUGLAS B. COMER

Attesting Officer

Acting Commissioner of Patents and Trademarks